United States Patent [19]

Tracy

[11] 4,024,781
[45] May 24, 1977

[54] AUTOMATIC HOLLOW VANE SHEAR

[76] Inventor: J. W. Franklin Tracy, 248-106 Ave. NW., Coon Rapids, Minn. 55435

[22] Filed: Dec. 4, 1975

[21] Appl. No.: 637,531

[52] U.S. Cl. .................................. 83/319; 83/268; 83/308; 83/320
[51] Int. Cl.² .................. B23D 25/04; B23D 25/16
[58] Field of Search ............ 83/308, 318, 319, 320, 83/186, 208

[56] References Cited

UNITED STATES PATENTS

| | | | |
|---|---|---|---|
| 3,129,624 | 4/1964 | Auer | 83/320 X |
| 3,704,643 | 12/1972 | Cookson | 83/319 X |
| 3,800,645 | 4/1974 | Alcock et al. | 83/308 X |
| 3,805,654 | 4/1974 | Plegat | 83/320 X |
| 3,808,923 | 5/1974 | Plegat | 83/320 X |

*Primary Examiner*—Willie G. Abercrombie

[57] ABSTRACT

A device for cutting to length, by shearing, articles known in the sheet metal and air conditioning art as hollow vanes. The device includes a wedge shaped cutting element, means for determining the length of vane to be sheared and a clamping element arranged adjacent the shearing blade to positively hold the vane after the length has been properly determined for shearing. The device is automatically controlled to provide length detection, clamping and shearing in proper sequence in coordination with a vane producing machine with control means provided to establish the recycling of the machine after a length of vane has been cut and has been delivered from the device. The clamping device provides a means for insuring continued flow of the vane through the die portion of the device and a sensing element is provided for retraction of the device after the shearing such that the sheared vane is free to fall from the device and not inhibit further flow of the vane through the device. This device provides an automatic shearing rather than a cutting mechanism for hollow vanes.

12 Claims, 9 Drawing Figures

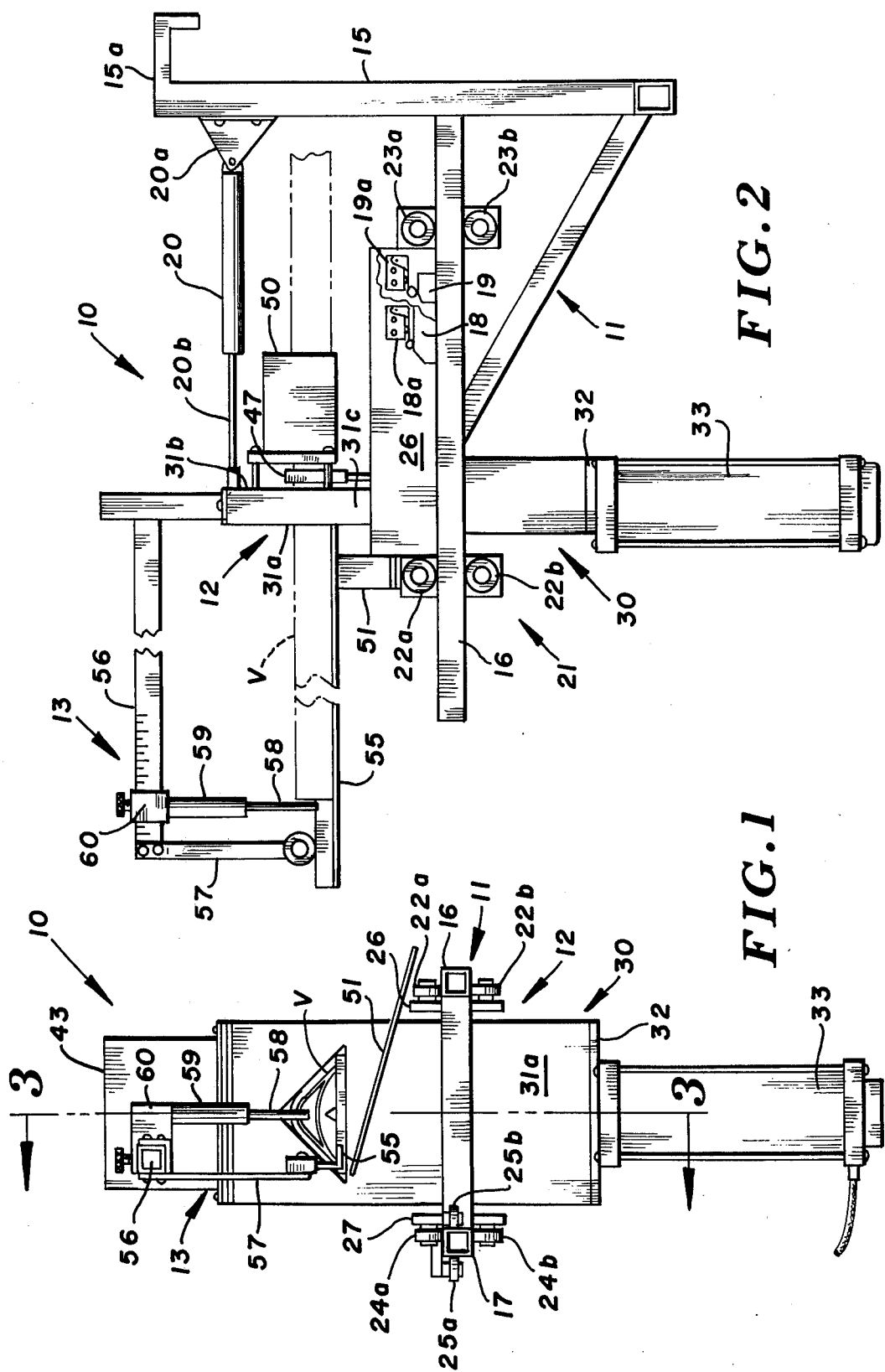

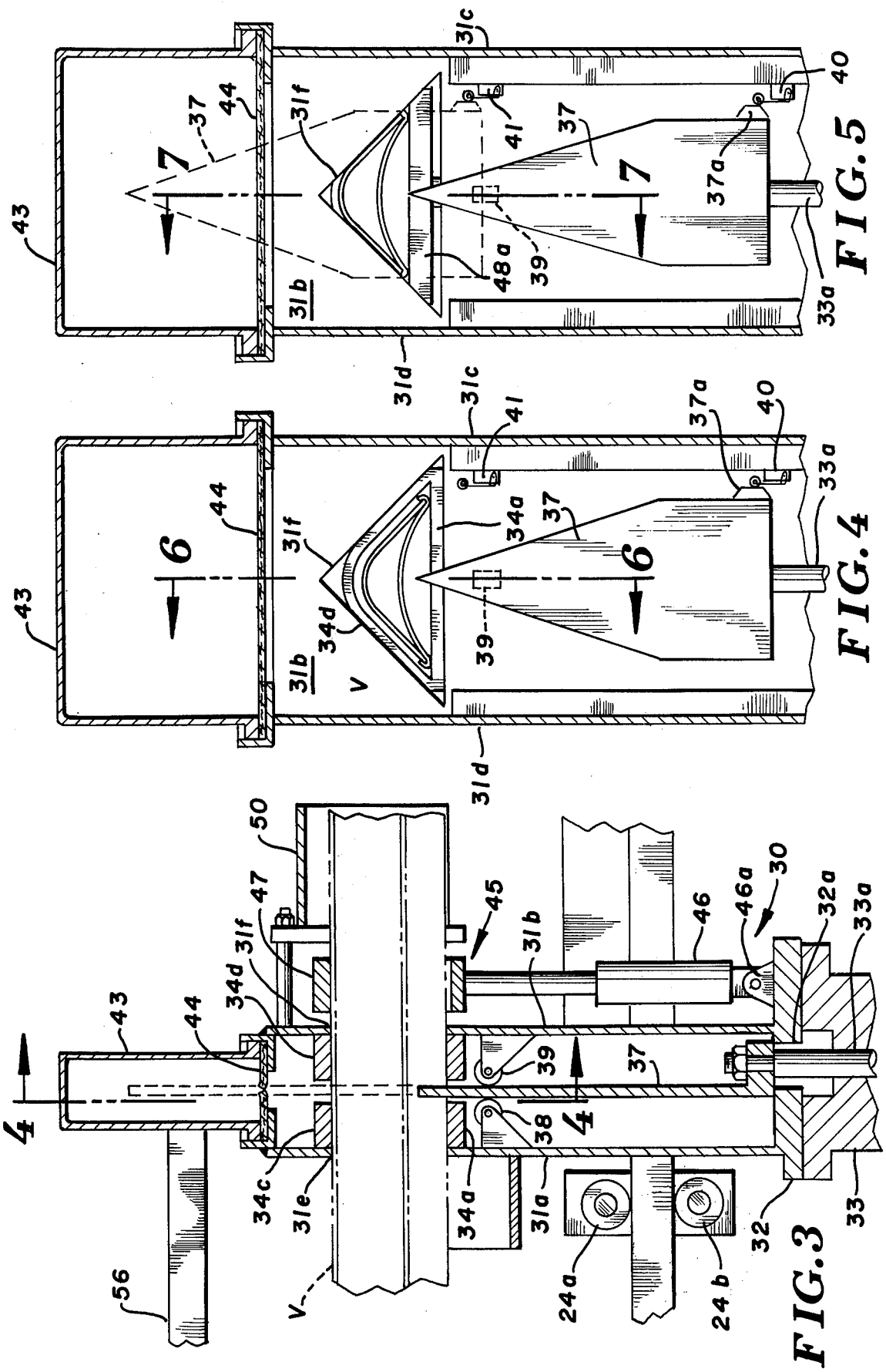

AUTOMATIC HOLLOW VANE SHEAR

FIELD OF THE INVENTION

This invention relates generally to devices for shearing of hollow vanes which are air flow directing or deflecting vanes for heating and ventilation and more specifically relates to an automatic shearing device which provides for automatic length determination, clamping and shearing of the vanes to such length and automatic recycling after such shearing.

BACKGROUND AND OBJECTS OF THE INVENTION

Hollow vanes are well understood in the art of heating, ventilating and air conditioning and these vanes are devices that are formed from two individual sheets of material joined at their lateral edges wherein a first sheet is provided with a first radius and a second sheet of another radius is arranged therebehind such that a space is provided between the sheets. The concept of such a vane is that at the corners of duct work, a cross-sectional area of the duct is obviously greater than at and in the straight line portions of the duct and the insertion of these vanes not only reduces the cross-sectional area but also guides the air flowing there-through smoothly around the corner.

In the past, applicant has provided a device for shearing of hollow vanes which eliminates any sawing process that was previously utilized to cut the vanes. When cutting had been used, much distortion of the two spaced surfaces would result and a smooth cut would not be achieved. The noise and time of sawing is also relatively greater in comparison to applicant's original shearing concept, this concept being fully set forth along with a device for accomplishing the same in U.S. Pat. No. 3,777,603, issued Dec. 11, 1973.

Applicant's device as disclosed herein is a modification of his initial shearing unit and now makes the shearing of such vanes automatic and which further, in certain aspects of this invention, permits control of the machine which produces the vanes.

With applicant's device, a shearing unit is provided which will effectively shear both of the surfaces which form the hollow van while the vane is held in a position to retain its desired, preformed shape. This preformed shape is normally produced from a vane producing machine and with applicant's device, the formed vane is introduced directly from the vane former to the shear where it is sheared to its desired length without interim cutting or storage thereof.

Applicant's device then provides a unit which may be, in a preferred form, utilized with a vane producing machine and when attached thereto may control the operation of the vane producing machine but whether used in conjunction with such a machine or used separately, the device will provide a means for automatically shear-hollow vanes to a predetermined length.

It is therefore an object of applicant's invention to provide an automatic hollow vane shear arranged and constructed to receive a preformed hollow vane, determine the length of vane delivered and upon a predetermined length being delivered, clamp the same and thereafter shear both of the surfaces of the vane.

It is a further object of applicant's invention to provide an automatic hollow vane shearing device which provides a clamping device for the vane passing therethrough which will normally hold the vane from a die surface to allow proper insertion of the vane into the die and will, after the vane has been delivered to a predetermined length, clamp the same against the die surface for proper shearing thereof.

It is still a further object of applicant's invention to provide an automatic hollow vane shearing device which will provide for the sequential receiving, clamping, shearing and movement of the shearing portion thereof which device may be used in conjunction with a vane forming machine and which device may be operatively arranged to control the vane forming machine.

It is still a further object of applicant's invention to provide a hollow vane shearing device which will sense a length of vane to be cut and allow predetermination of such length and which further provides for clamping of the vane during the shearing process and which will release such clamping force to permit the sheared vane to be released from the device.

These and other objects and advantages of applicant's invention will more fully appear from a consideration of the accompanying disclosure made in association with the included drawing in which the same numeral is utilized to identify the same or similar parts throughout the several views, and in which:

FIG. 1 is a front elevation of a shearing device embodying the concepts of applicant's invention;

FIG. 2 is a side elevation of the vane cutting device illustrated in FIG. 1 and having portions thereof broken away to facilitate showing the means for determining the length of vane to be sheared;

FIG. 3 is a vertical section taken substantially Line 3—3 of FIG. 1;

FIG. 4 is a vertical section taken substantially along Line 4—4 of FIG. 3;

FIG. 5 is a view similar to FIG. 4 illustrating the differentiation between clamping of the vane into shearing position and illustrating the movement of the shearing blade therethrough;

Figure 6:
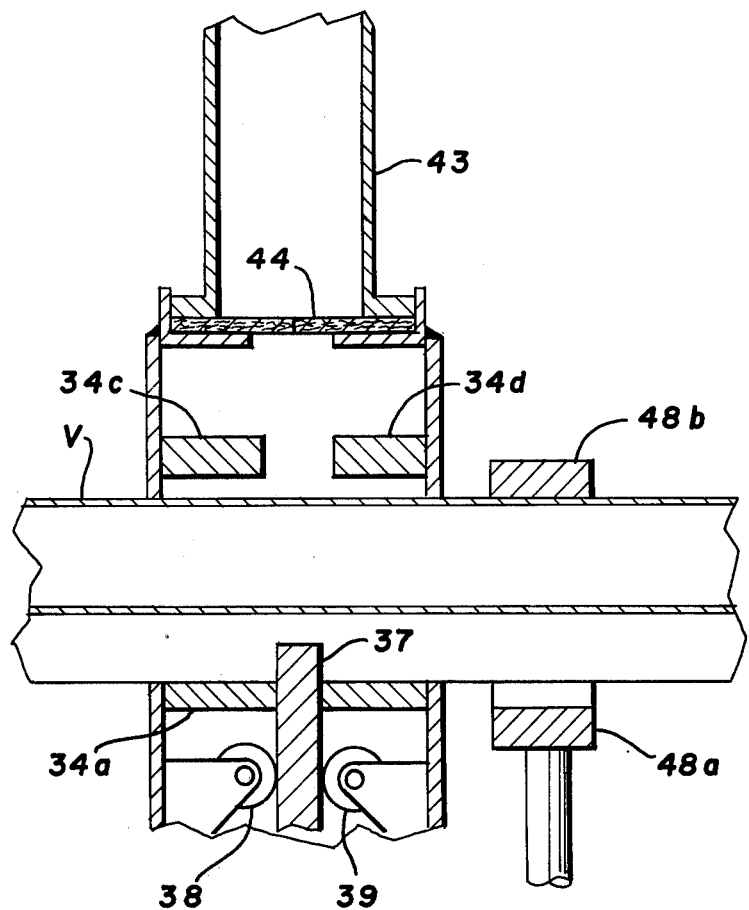
FIG. 6 is a vertical section taken substantially along Line 6—6 of FIG. 4 and being drawn to an enlarged scale.

In accordance with the accompanying drawings, applicant's shearing device is generally designated 10 and includes a supporting and connective section 11, a clamping and shearing section 12 and a length determining section 13.

The basic concept of applicant's shearing device is to receive the preformed vane from a vane forming machine, allow the vane to advance through the clamping and shearing section until it reaches a length determining stop member at which time the clamping and shearing section is pulled forwardly by continued movement of the vane until a predetermined amount of movement of the shearing section has taken place at which time the vane forming machine is stopped and the vane is sheared. Upon completion of the shearing, the shearing section is retracted and upon total retraction, the unit is automatically recycled. Obviously the clamping and the movement of blade which accomplishes the shearing must be coordinated with the forward and rearward movement of the clamping and shearing section.

The supporting and connective section 11 includes a framework including a pair of spaced vertical uprights (one being shown) 15 having hook means and clamping means 15a at their upper ends such that the entire device 10 may be attached to a vane forming machine (not shown). Extending horizontally outward from the uprights 15 are a pair of track members 16, 17 upon which the clamping and shearing section 12 will move. Cam means 18, 19 are mounted respectively upon the track members 16, 17; cam 18 being mounted on track 16 and cam 19 being mounted on track 17. It should be noted that cam 19 is arranged rearwardly of cam 18 and this cam, 19, is a recycling cam such that when the clamping and shearing section 12 has been fully retracted, a switch member 19a carried by the clamping and shearing section will engage the same for automatic recycling. Cam 18 is arranged to control switch mechanism 18a and upon forward movement of the clamping and shearing section 12, movement of the switch from the camming surface will deactivate the vane forming machine.

For proper structural considerations, it should be obvious that cross support members should be provided for the framework of this section.

A retraction cylinder 20 is provided between the connective and supporting section 11 and the clamping and shearing section 12 and one end 20a thereof is affixed to one of the vertical frame members 15.

The clamping and shearing section 12 includes a roller structure 21 to allow movement thereof upon the track section 16, 17 and this roller structure includes forward and rearward upper and lower roller members 22a, 22b and 23a, 23b respectively arranged to engage track section 16 with upper, lower, forward and rearward 24a, 24b (only the forward most set being shown) roller sets arranged to engage track 17 with additional lateral support rollers 25a, 25b arranged to engage the sides of track section 17. This roller structure provides a carrier for the clamping and shearing section and longitudinally extending connective member 26, 27 are provided for joining these various roller sets. In addition to such longitudinally extending connective members, it should be obvious that lateral connective members must be provided to form the carrier.

It should be noted that the lateral support rollers 25a, 25b are provided to contact only one of the track members, 16 or 17. This will allow a free floating arrangement for the carrier 21 and will allow for any misalignment between the tracks or within the carrier itself.

The aforementioned switches 18a, 19a are arranged respectively on the longitudinally extending connective members 26, 27.

The clamping and shearing section 12 is carried by the carrier structure and this section includes both the clamp device and the shear device.

The shear device is generally designated 30 and is arranged to extend laterally across the path that is taken by the vane V as the same exits the forming machine. The shear device 30 includes a vertically arranged housing 31 having forward and rear faces 31a, 31b and sides 31c, 31d. The lower portions of these faces and sides are affixed to a base element 32 to which a downwardly depending power cylinder 33 is attached. In the form shown, this cylinder is an air powered cylinder and the drive rod 33a thereof passes into the housing formed by the faces and sides as mentioned, through an aperture 32a formed in the base element 32.

Figure 8:
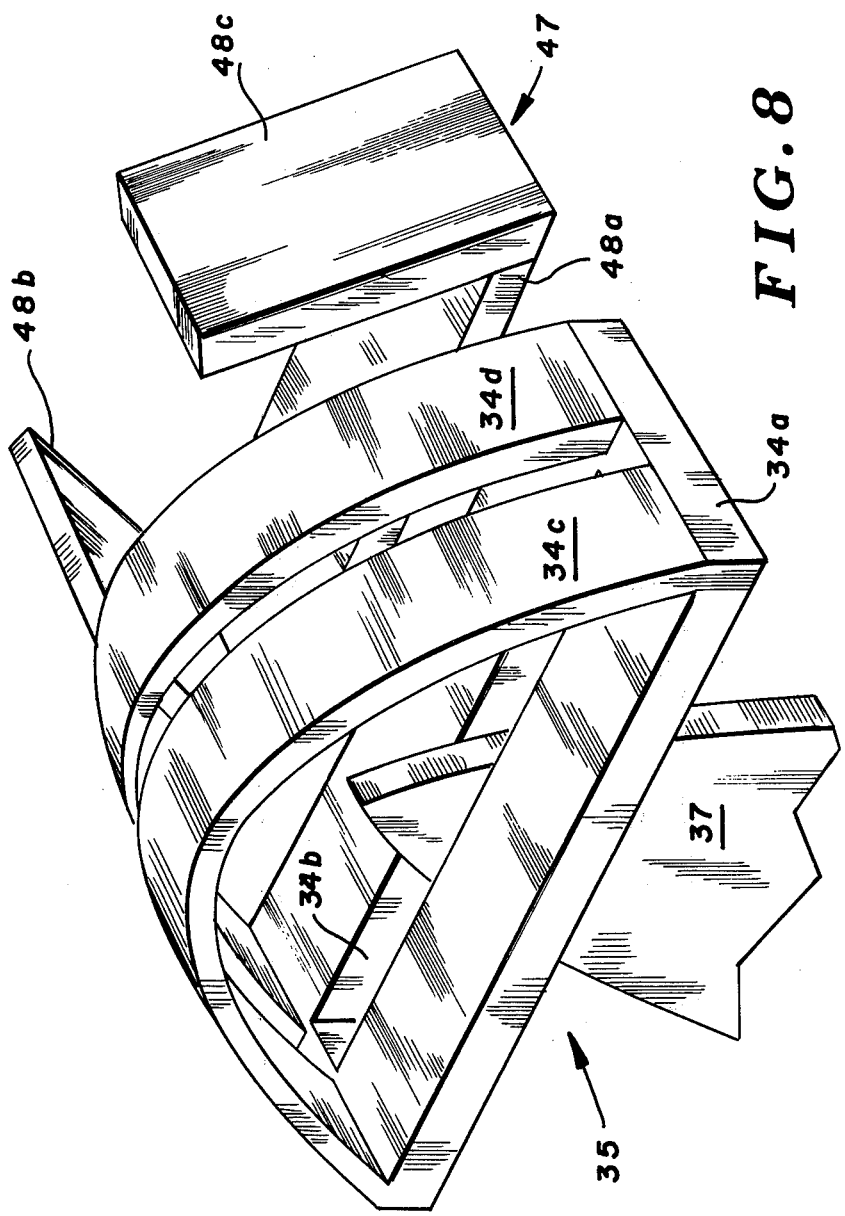
FIG. 8 is a selected view showing the die arrangement and the clamp arrangement for the vane and shearing blade of the unit; and, FIG. 9 is a schematic illustration of the circuitry for operation of applicant's device.

The faces 31a, 31b of the housing 31 are provided with substantially triangular shaped openings 31e, 31f which permit passage of the vane V therethrough. Adjacent to and in alignment with the apertures 31e, 31f is a die structure designated generally 35 and which is best illustrated in FIG. 8. This die structure 35 extends between the faces and sides of the housing 31 and is also generally triangular in shape to permit the vane to pass therethrough, although as illustrated in FIG. 8, the upper surfaces thereof are curved to match the configuration of the vane V. As illustrated in FIG. 8, a base 34a, generally rectangular in shape and having a generally rectangular passage arranged vertically therethrough, said passage being designated 34b, is provided and a pair of curved triangular shaped dies are secured thereto on the ends thereof, said dies being designated 34c, 34d. A spacing is provided between the dies to receive the blade for shearing which retained passes through the base opening 34b through the vane retained therethrough and ultimately through the dies 34c, 34d.

The blade 37 which accomplishes the shearing of the vane is attached at its lower end to the drive rod 33a of the cylinder 33. The blade is of a predetermined width to pass through the die section 35 and the vane V. The action of the blade and the dies 34c, 34d shear the vane V without damaging the edges thereof.

A pair of guiderollers 38, 39 are arranged to extend inwardly from the faces of the housing adjacent the base 34a of the die section 35 such that the blade 37 will be maintained in proper alignment with the die 35 and the passages therethrough.

The blade is arranged with camming means 37a on one side thereof adjacent the lower end thereof and a pair of sensing means 40, 41 are arranged at the lower and upper end of the housing 31 to sense the position of the blade and control other aspects of the device in response thereto.

Arranged at the upper end of housing 31 is an enclosed blade receiving housing 43 which will receive the upper end of the blade 37 after the same passes through the vane V. Arranged between the main housing 31 and this blade receiving housing 43 is an oiler device 44 which may include a piece of felt or other oil retaining material for wiping the blade as it passes therethrough. This material should be provided with an opening therein such that the blade tip wil not tear the same. Means for introducing the material used for wiping the blade must be provided and this could be a simple aperture at the top of the housing 43.

The other end 20b of the retraction cylinder 20 may be attached to any portion of the clamping and shearing section 12.

Figure 7:
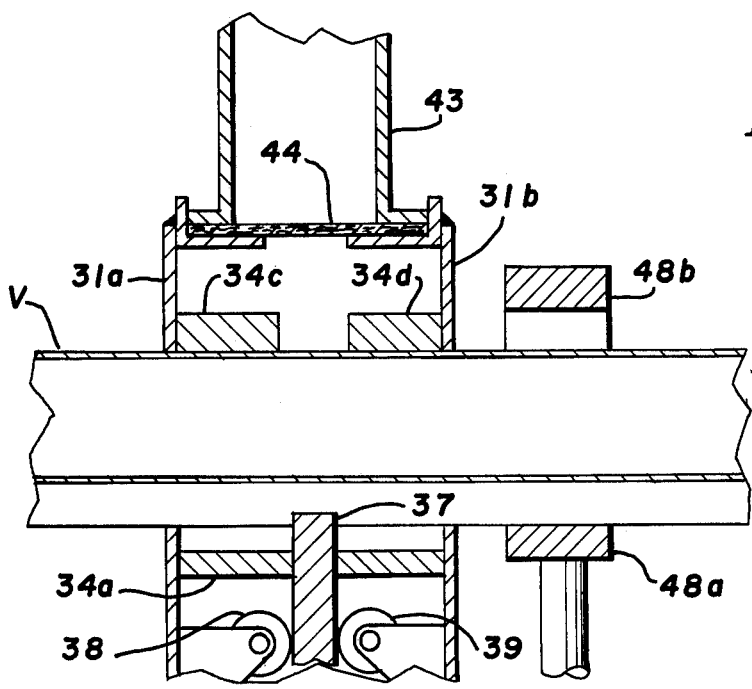
FIG. 7 is a vertical section taken substantially along Line 7—7 of FIG. 5 and being drawn to an enlarged scale and illustrating the vane being held in shearing position.

The clamping and shearing section also includes a clamp element generally designated 45. This clamp element is controlled by an air powered cylinder 46 having one end 46a thereof attached to the base 32 of housing 31 and extends upwardly therefrom to the actual clamp device 47. This clamp 47 is illustrated in FIG. 8 in a position approximating its operating position with respect to the shearing die 35. This Figure does not illustrate the housing face 31b. This clamp 47, in the form shown, includes a base section 48a extending laterally across the path of the vane V and a pair of upwardly and inwardly directed vane contacting elements 48b, 48c. These vane contacting elements 48b, 48c are arranged to contact the rear surface of the vane V and pull the same downwardly while the base portion 48a is designed to abut with the lateral edges of the vane V and force the vane upwardly against the dies 34c, 34d of die 35. The cylinder is of the spring return type such that when the same is not powered, it will be pulled downwardly thus insuring that the forward edge of a vane V will not contact the die surface 34c when the vane is moved relative thereto but the cylinder will force the same vane upwardly against the dies 34c, 34d for proper shearing. This comparison is shown in FIGS. 6 and 7.

A safety shroud 50 is arranged adjacent the clamp section and is supported from the housing 31.

Also arranged on the forward face 31a of the housing 31 is a material guide 51 such that after the vane is sheared, it wil be directed to the side of the device.

The length determining section 13 includes a vane support 55 which is designed to support one lateral edge of the vane V after it has passed through the device and prior to shearing. This is a stationary item and must be supported relative to the shearing device.

Also extending forwardly of the housing 31 is a measuring rod or the like 56 which is carried through a roller carried on the vane support 55. This rod is provided with measuring increments. A retractable stop 58 is provided on a power cylinder 59 which is adjustably moveable along measuring rod 56 through a tightenable housing 60. The measuring rod is attached to the forward face of the housing 31 and is moveable therewith and abutment of vane material with the adjustable and retractable stop 58 will cause the shearing and clamping section 12 to move forwardly on the support section 11.

Figure 9:
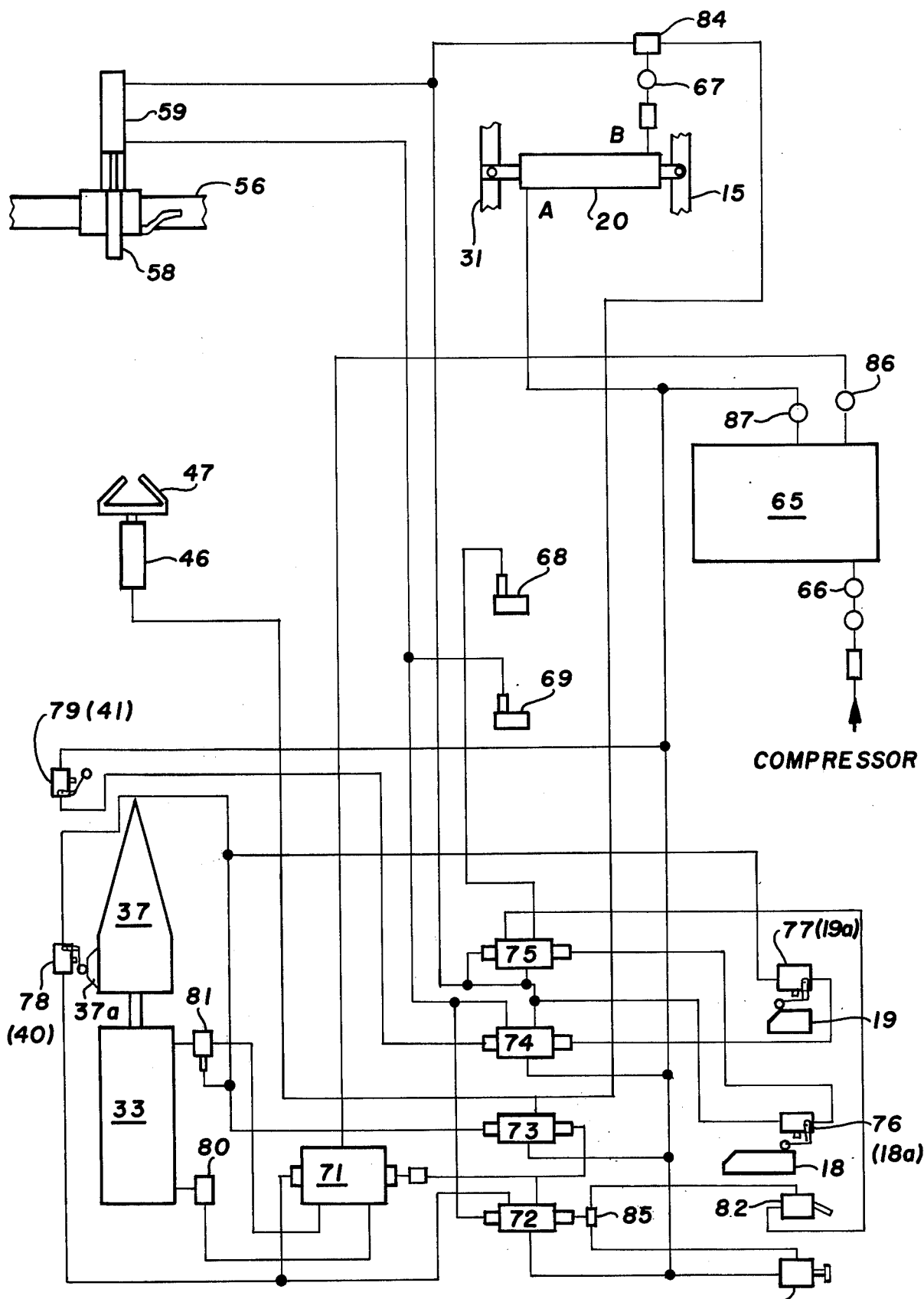

In considering the schematic diagram of FIG. 9, several additional elements must be introduced. These include a holding tank 65, a pair of regulators 66, 67, regulator 67 being set at a pressure below that of regulator 66, a pair of switches 68, 69 and various valves designated respectively 71 through 85, valves 76 and 77 were previously designated as 18a, 19a respectively and valves 78, 79 were previously designated as switches 40, 41 respectively.

Valves 71 through 75 are basically all identical valves in that they are provided with two pilot ports which are illustrated on the ends of the valve bodies, two work ports that radiate from the body, one inlet port into the body and a pair of outlet or exhaust ports which are not illustrated but which exhaust directly to atmosphere. It should be noted on the schematic that valve 73 has one of its work ports blocked, the other work port being connected to clamping cylinder 46. Also, in addition to this, the pilot actuator communicating with one of the pilot ports of valve 75 is larger than the actuator on the opposite pilot port such that this valve 75 will normally be shifted to permit flow through one work port.

In addition to these considerations, when referring to the air valves of the schematic, the term "open" means that the inlet port is connected internally of the valve to the work port thus permitting flow of pressurized air through the valve while the term "closed" means that the work port is connected to the exhaust port of the valve thus permitting downstream air to bleed back through the valve. When referring to an electrical switch, the term open means that the points of the switch are not in contact and there is no current flow. The term closed means that the points of the switch are in contact and current is able to flow.

A description of the accompanying circuit through one cycle is as follows:

Air from the conpressor is introduced through regulator 66 to the holding tank 65. The holding tank obviously is required to maintain adequate volume and pressure at the shear to achieve a rapid cycle.

Air flows from the holding tank through a lubricator 86 to the inlet port of 71. Air likewise flows through a small lubricator 87 to the inlet ports of 72, 73, 74, 79, 83 and to port A of cylinder 20.

Air is supplied through the work port of 72 to a pilot port of 71. This permits the flow of air from work port of 71 to the inlet port of 80 which is connected through its work port to the cylinder 33. Air is also supplied through the work port of 72 to the inlet port of 78. 78 is held open by the cam 37a on the shear blade 37 when the shear blade 37 is at rest and supplies air to the inlet port of 77 and to pilot port of 73 which holds 73 in a closed position with the air in cylinder 46 vented through the exhaust port of 73. Air is also supplied by 78 to the pilot port of 80 thus holding 80 in the closed position and venting air from cylinder 33 to atmosphere through the exhaust port of 80. Valve 77 is held open by a cam 37a when the shear 37 is at rest and supplies air to the pilot port of 74 which permits flow of air from work port of 74 to the following:

inlet port of 76
inlet port of 75
pilot port of 75

59 to hold the gauge stop 58 in a down position port B of 20 through the shuttle valve 84, regulator 67 and a flow control valve.

76 is held open by cam 37a when the shear 37 is at rest and supplies air to the pilot port of 75. As previously stated, the pilot actuator of 75 on one side thereof is larger than the actuator on the other side thereof and this will keep 75 shifted so as to permit flow through a first work port of 75. This will supply air to the actuator of switch 68 thus holding it in the closed position. This swtich 68 is wired in series with the motor starting relay of the vane making machine to which applicant's device is attached. An additional manual switch is also wired in series in this circuit to permit starting the vane machine when 68 is in the closed position. Opening of either the manual switch or 68 will stop the vane machine.

The shearing and clamping section 12 of the device, as previously stated, is mounted for movement on the support section 11. The movement of the shear and clamping device 12 is normally restrained from free movement by the resultant of the differential pressures at the two ports of the cylinder 20.

A formed vane is delivered through the outfeed side of the vane machine and passes through the shearing and clamping section 12 until it strikes the gauge stop 58 which is mounted on the ram of cylinder 59. When the vane strikes this stop 58, the shearing and clamping section is pulled ahead by the continual feeding of the vane against the restraining pressure in the cylinder 20. 76 and 77 are mounted on the shearing and clamping section 12 and their controlling cams 18, 19 are mounted on the aforementioned tracks 16, 17. As forward movement is obtained, 76 and 77 are disengaged from their controlling cams. 77 closes first which allows pressure in the pilot actuator of 74 to bleed back through the exhaust port of 77. Valve 74 does not shift at this time, but remains in position, ready to shift when its opposite pilot actuator is pressurized. Upon the closure of 76, air is allowed to flow from the pilot actuator port of 75 to bleed through the exhaust port of 76. This allows the pressure in the pilot actuator of 75 to shift the valve 75. Air from 68 is then allowed to bleed back through the exhaust port of 75. 68 will then open and this will stop the operation of the vane machine.

Air from the work port of 75 flows to the inlet of 82. Valve 82 is a toggle operated valve which can be closed when first starting new material through applicant's vane shearing device and which may be then opened after the rough end of the new vane has been fed through the shearing apparatus and cropped by actuating valve 33. Air from the outlet port of 82 flows through a shuttle valve 85 to a pilot port of 72 causing this valve to shift. Air from the pilot port of 71, pilot port of 73, pilot port of 80 and the line to 77 is then allowed to bleed back through the exhaust port of 72.

Air from one work port of 72 flows to the pilot port of 73 causing this valve to shift. Air also flows to the pilot port of 71 through a flow control valve which causes a slight delay in the shifting of valve 71. This delay is to allow the vane to be fully clamped before the shear blade 37 is actuated. Air from 73 causes cylinder 46 to extend against the pressure of its internal spring and clamp the vane firmly. The vane is clamped on the infeed side of the shear blade 37 such that the vane is held stationary until the shear blade 37 is fully retracted following the shearing cut. At the same time, air also flows to valve 84 at port B of cylinder 20.

Air from the work port of 71 flows to a port of cylinder 33 causing it to extend and shear the vane. When cylinder 33 reaches the extent of its travel, the cam 37a mounted thereon contacts the roller lever on 79 causing it to open. Air flows through this valve to the pilot port of 74 causing it to shift. Air from 76, inlet port of 75, the pilot port of 75, and cylinder 46 and the shuttle valve 84 at port B of cylinder 20 are all allowed to bleed through the exhaust port of 74. The pressure at port B of cylinder 20 remains constant as it is being supplied through the other port of 84 by air from 73. Air from the work port of 74 flows to the pilot port of 72 causing this valve to shift. Air also flows to 69 causing it to close and give an impulse to an electro mechanical counter in the vane machine. Obviously, this is an additional operative device which may or may not be included in the operative situation. Air from the work port of 74 also flows to the port of 59 causing it to retract and move the gauge stop 58 out of contact with the end of the vane. This permits free scavenging of the cut portion of the vane during the cylinder 20 retraction stroke. Air from the work port of 72 flows to the pilot valve of 71 causing it to shift. Air also flows to the inlet valve of 78 which is closed at this time. Air from the cylinder 33 is exhausted to atmosphere through the "quick exhaust valve" 81.

Air is also supplied from the work port of 71 through the open valve 80 to the port of cylinder 33 causing this cylinder to retract. When the cylinder 33 reaches the end of its stroke, the cam 37a on the blade 37 contacts the roller lever of 78 causing it to open and allow air from the work port of 72 to flow to the pilot port of 73 causing this valve to shift. Air is supplied to the inlet of 77 which is closed at this time and also to the pilot port of 80 causing it to close and bleed air from cylinder 33 through the exhaust port of 80 to atmosphere.

Air from cylinder 46 bleeds back through the exhaust port of 73 allowing the internal spring in cylinder 46 to retract and release the clamping effect. Air is also bled from port B of cylinder 20 through a flow control valve to the exhaust port of 73.

Pressure through port A of cylinder 20 causes this cylinder to retract and return the shear and clamping section 12 rapidly to its starting position. A cushioning effect is obtained at the end of the stroke by the flow control valve at port B of this cylinder 20. During the retraction stroke of this section, a new portion of the vane moves through the shear and pushes the cut portion out of the shear to cause it to fall sideways on guide 51 and downwardly out of the device.

Near the end of the retract stroke of cylinder 20, cams 18, 19 engage the roller levers of 76 and 77 causing them to open. 77 opens last and allows air to flow to the pilot port of 74 causing this valve to shift. Air from the pilot port of 72, pilot actuator of 69 and 46 is allowed to bleed through the exhaust port of 74. 69 opens to complete the counter impulse for counting vanes delivered and cut. Air from the work port of 74 flows then to the following:

the inlet port of 76 and through it to the pilot of 75 thus causing valve 75 to shift the inlet port of 75 the pilot port of 75 the port of the cylinder 59 which will cause the gauge stop 58 to return to its material receiving position port B of cylinder 20 through the shuttle valve 84 of the regulator and the flow control valve to restore differential pressure to cylinder 20 air from the work port of 75 also flows to 68 also causing it to close and restart the vane machine for the next cycle.

A study of this schematic and the description related thereto should obviously show the close relation to an automatic vane making machine but it should be obvious that applicant's device does not concern itself with the source of the vane material but rather only relies on the vane passing therethrough for proper sequential operation of the various portions thereof. The delivery of the vane material could be accomplished by an individual without affecting the operation of applicant's device as long as the individual responded to the signals which the control circuitry produces.

The invention aspect of applicant's device provides for the automatic shearing of vane material delivered thereto which is accomplished by a correlation of elements for measuring, clamping, shearing and releasing the sheared material.

What I claim is:

1. A device for automatically shearing hollow vanes, which hollow vanes are driven into the device; said device including:
   a. a supporting section having a generally horizontally extending track section;
   b. a shearing and clamping section arranged for movement on said track section, said shearing and clamping section including;
      1. a die arranged to receive and allow a formed hollow vane to pass therethrough, said die including a pair of generally triangular shaped die elements to agree with a surface of the vane to be sheared, said die elements being spaced from one another to permit said shearing blade to pass therethrough to shear the vane;
      2. a shearing blade arranged on association with said die for shearing of a vane received therein;

3. clamping means for clamping the vane against one surface of said die during the shearing thereof;
4. means for sequentially actuating said clamp means and said shearing blade;
5. sensing means associated with said shearing and clamping section to control movement thereof and actuation of said clamping and shearing means;

c. vane length determining means extending forwardly from said shearing and clamping section and being movable therewith, including stop means for receiving the vane thereagainst and moving the same along with said shearing and clamping section; and, d. sensing means for controlling said clamping means and said shearing blade subsequent to abutment of the vane with said stop means and movement of said shearing and clamping section.

2. The structure set forth in claim 1 and said supporting structure including at least a pair of spaced apart horizontally extending rail sections to carry said shearing and clamping section.

3. The structure set forth in claim 2 and said shearing and clamping section including a carrier member, said carrier member including:

a. two pairs of roller members arranged respectively on each of said rail sections, each pair including a roller member contracting an upper and a lower roller member to engage an upper and a lower surface of said rail sections; and, b. said shearing and clamping section being arranged to extend transversely between said pairs of roller members.

4. The structure set forth in claim 3 and lateral support roller members arranged to contact one of said rail sections to prevent lateral movement of said shearing and clamping section relative to said supporting structure.

5. The structure set forth in claim 1 and a generally vertically extending housing, said die and said shearing blade being arranged with said housing, said housing being provided with formed apertures to permit a vane to pass therethrough, said die being arranged adjacent said apertures to permit the vane to pass therethrough.

6. The structure set forth in claim 1 and said clamping means arranged adjacent said die on the vane receivng said thereof.

7. The structure set forth in claim 6 and said clamping means being normally biased to prevent contact of the delivered vane with said die.

8. The structure set forth in claim 1 and said actuating means and said sensing means controlling the movement of said shearing and clamping section whereby clamping of the vane is accomplished prior to shearing thereof and clamping of the vane is released subsequent to shearing thereof.

9. The structure set forth in claim 1 and said stop means including an adjustable stop member movable with respect to said die and shearing blade whereby the length of vane to be sheared maybe predetermined.

10. The structure set forth in claim 9 and means for retracting said stop means from abutment with the vane after shearing thereof to permit the sheared vane to be removed from the device.

11. The structure set forth in claim 1 and retraction means arranged between said supporting section and said shearing and clamping section for retraction of said shearing and clamping section after shearing of the vane.

12. The structure set forth in claim 1 and signal means associated with said shearing and clamping section whereby hollow vanes will be driven into the device upon a first signal and will be stopped upon a second signal, said signals being generated in response to movement of said shearing and clamping section on said track section.

* * * * *